United States Patent
Kederer et al.

(10) Patent No.: US 12,350,803 B2
(45) Date of Patent: Jul. 8, 2025

(54) CHISEL AND METHOD FOR PRODUCING A CHISEL

(71) Applicant: Robert Bosch GmbH, Stuttgart (DE)

(72) Inventors: Miriam Kederer, Constance (DE); Nicola Intini, Noci (IT); Paolo Redondi, Brembate Bergamo (IT); Massimo Anghileri, Solothurn (CH)

(73) Assignee: Robert Bosch GmbH, Stuttgart (DE)

( * ) Notice: Subject to any disclaimer, the term of this patent is extended or adjusted under 35 U.S.C. 154(b) by 862 days.

(21) Appl. No.: 17/423,424

(22) PCT Filed: Jan. 3, 2020

(86) PCT No.: PCT/EP2020/050063
§ 371 (c)(1),
(2) Date: Jul. 15, 2021

(87) PCT Pub. No.: WO2020/151929
PCT Pub. Date: Jul. 30, 2020

(65) Prior Publication Data
US 2022/0097220 A1    Mar. 31, 2022

(30) Foreign Application Priority Data

Jan. 23, 2019   (DE) ..................... 10 2019 200 776.7

(51) Int. Cl.
*B25D 17/02*   (2006.01)
*B23B 51/00*   (2006.01)
(Continued)

(52) U.S. Cl.
CPC .............. *B25D 17/02* (2013.01); *B23B 51/00* (2013.01); *B23K 31/025* (2013.01);
(Continued)

(58) Field of Classification Search
None
See application file for complete search history.

(56) References Cited

U.S. PATENT DOCUMENTS 3,229,427 A * 1/1966 Staplehurst ............. B23B 51/06
451/450
3,510,990 A * 5/1970 Steindler .................. B24D 5/06
451/541
(Continued)

FOREIGN PATENT DOCUMENTS

CN    1218427 A    6/1999
CN    101048528 A    10/2007
(Continued)

OTHER PUBLICATIONS

Machine translation of DE102011085818A1 (Year: 2024).*
(Continued)

*Primary Examiner* — Geoffrey S Evans
(74) *Attorney, Agent, or Firm* — Maginot, Moore & Beck LLP (57) ABSTRACT

An application tool, in particular a chisel or a drill bit, is disclosed. The application tool has a tool head. The application tool further has a shank region in which a main body is arranged, wherein the main body has a first hardness. The application tool further has a coating that has a second hardness greater than the first hardness. The coating includes a hard metal, which comprises a hard material and a metal matrix. Advantageously, the durability of the application tool can be increased as a result.

17 Claims, 8 Drawing Sheets

(51) Int. Cl.
   *B23K 31/02*    (2006.01)
   *B23K 10/02*    (2006.01)
(52) U.S. Cl.
   CPC ........ *B23K 10/027* (2013.01); *B25D 2222/09* (2013.01); *B25D 2222/51* (2013.01)

(56) References Cited

U.S. PATENT DOCUMENTS

| | | | |
|---|---|---|---|
| 4,682,987 | A | 7/1987 | Brady et al. |
| 4,864,094 | A | 9/1989 | Saltzman et al. |
| 4,944,559 | A | 7/1990 | Sionnet et al. |
| 2006/0185908 | A1* | 8/2006 | Kembaiyan .............. E21B 10/54 175/425 |
| 2008/0054707 | A1* | 3/2008 | Hall ....................... B25D 17/02 299/69 |
| 2009/0256413 | A1 | 10/2009 | Majagi et al. |
| 2015/0091365 | A1* | 4/2015 | Laux ..................... E21C 35/183 299/104 |
| 2015/0196991 | A1* | 7/2015 | Montross ............... B24D 3/342 51/309 |
| 2016/0221135 | A1* | 8/2016 | Tiefenbock ............... B23C 5/16 |
| 2018/0339355 | A1* | 11/2018 | Forbes ................. C22C 29/067 |
| 2021/0252686 | A1 | 8/2021 | Redondi et al. |

FOREIGN PATENT DOCUMENTS

| | | | | |
|---|---|---|---|---|
| CN | 101652500 | A | 2/2010 | |
| CN | 103388145 | A | 11/2013 | |
| CN | 103506811 | A | 1/2014 | |
| DE | 10 2005 048 474 | A1 | 4/2007 | |
| DE | 11 2005 003 357 | T5 | 4/2008 | |
| DE | 20 2011 002 916 | U1 | 7/2011 | |
| DE | 102011085818 | A1 * | 5/2013 | ............ B23K 9/042 |
| DE | 10 2012 224 434 | A1 | 7/2014 | |
| DE | 10 2017 122 079 | A1 | 3/2018 | |
| GB | 760353 | A | 10/1956 | |
| RU | 2480974 | C1 * | 5/2013 | |
| WO | 2006/125234 | A1 | 11/2006 | |
| WO | WO-2009043617 | A1 * | 4/2009 | ............ B25D 17/02 |
| WO | WO-2015034465 | A1 * | 3/2015 | |

OTHER PUBLICATIONS

Machine translation of WO 2009043617 (Year: 2024).*
Machine translation of RU-2480974-C1, Jul. 2024 (Year: 2024).*
International Search Report corresponding to PCT Application No. PCT/EP2020/050063, mailed Mar. 27, 2020 (German and English language document) (6 pages).

* cited by examiner

CHISEL AND METHOD FOR PRODUCING A CHISEL

This application is a 35 U.S.C. § 371 National Stage Application of PCT/EP2020/050063, filed on Jan. 3, 2020, which claims the benefit of priority to Serial No. DE 10 2019 200 776.7, filed on Jan. 23, 2019 in Germany.

SUMMARY

The disclosure relates to an insert tool, in particular a chisel or a drill, having a tool head, having a shaft region in which a main body is arranged, wherein the main body has a first hardness, and having a coating which has a second hardness that is greater than the first hardness. It is proposed that the coating has a hard metal which comprises a hard material and a metal matrix. Advantageously, the durability of the insert tool can be prolonged as a result.

The drill can be formed, for example, as a masonry drill or as a tile drill which is provided for a hammer drill. The chisel can be formed, for example, as a flat chisel or as a pointed chisel, which are provided for a hammer drill and/or a breaker. At its end facing away from the tool head, the insert tool has an insertion end, which is designed to be coupled to a handheld power tool, such as a hammer drill. Preferably, the insert tool is formed in the region of the insertion end such that the insert tool can be coupled to a tool holder of the handheld power tool. For example, the insert tool can have formfitting elements designed as specific grooves in the region of the insertion end, which form an SDS-plus or an SDS-max interface. Alternatively, a hex interface or the formation of the insertion end as a round shaft, for example, would also be conceivable. To process a workpiece, the insert tool is set into a rotating and/or linearly oscillating or impacting state by means of the hammer drill. The insert tool penetrates into the workpiece in the feed direction of the insert tool during the processing. The feed direction of the insert tool extends coaxially to the longitudinal axis of the insert tool and in the direction of the tool head, starting from the insertion end. The longitudinal axis of the insert tool corresponds in particular to a working or rotational axis of the insert tool. In this connection, a tool head is to be understood, in particular, as a region of the insert tool which is designed to process and/or part the workpiece. The tool head preferably has at least one cutting element. The tool head can have one or more cutting elements. Each cutting element has at least one cutting edge or a cutting tip. Preferably, each cutting element has an individual cutting edge. Alternatively, the cutting element can also have multiple cutting edges, which in particular merge into one another. In particular, the region of the tool head is covered by the at least one cutting element. The main body is in particular formed from a high-speed steel or a steel suitable for hardening, such as, for example, 42CrMo4, 46CrB2, 41Cr, 34CrNiMo16 or C45, C50. The main body preferably has a hardness in the range between 48 and 56 HRC (Hardness Rockwell C).

The hard material consists in particular of tungsten carbide. The tungsten carbide can be formed, for example, as a cast tungsten carbide—CTC, consisting of an in particular eutectic mixture of W2C and WC, a spherical cast tungsten carbide—CTC-s, and/or a monocrystalline tungsten carbide—MTC. The hard material preferably has a hardness in the range between 1700 and 3100 HV0.1 (Vickers hardness test), preferably in the range between 2000 and 2300 HV0.1.

The hard material preferably consists of hard material particles which have an in particular average size in the range between 50 and 180 μm.

The metal matrix can comprise a cobalt alloy, a cobalt-chromium alloy or a nickel alloy. Alternatively, it is also conceivable that the metal matrix is based on cobalt or iron. The nickel alloy is preferably formed as an NiBiSi or an NiCrBSi alloy. Depending on the ratio between the hard material and the metal matrix, a hardness of 30 to 65 HRC is conceivable. Preferably, the weight ratio between the hard material and the metal matrix is 60% to 40%. Preferably, the hardness of the hard metal is between 50-63 HRC.

Furthermore, it is proposed that the coating is arranged on the tool head and/or in the shaft region. As a result, the durability of the insert tool can advantageously be improved further. In particular, the insert tool is covered completely by the coating in the region of the tool head and reaches into the shaft region of the insert tool. Preferably, the main body in the shaft region has a substantially cylindrical lateral surface, at least in some sections, in particular completely.

Furthermore, it is proposed that the coating has at least two coating elements, which are arranged partly or completely spaced apart from one another. Advantageously, a local reinforcement of the insert tool can be implemented as a result. In particular, the coating elements are formed as a coating track.

The coating elements have a thickness which in particular is less than 50% of the diameter of the insert tool in the region of the coating, preferably is less than 25% of the diameter of the insert tool in the region of the coating, preferably is less than 15% of the diameter of the insert tool in the region of the coating. The coating element can enclose the insert tool completely in subregions. Alternatively, it is also conceivable that the coating element encloses the insert tool partially, wherein the width of the coating element is in particular less than 60% of the circumference of the insert tool in the region of the coating element, preferably less than 45% of the circumference of the insert tool in the region of the coating element, preferably less than 30% of the circumference of the insert tool in the region of the coating element. The coating elements can be applied simultaneously or successively to the insert tool, in particular the main body of the insert tool. Alternatively, it is also conceivable that the coating consists of a single coating element. In particular, the coating elements are spaced apart uniformly from one another.

In addition, it is proposed that the coating, in particular the at least one coating element, extends rectilinearly, parallel or obliquely to the longitudinal axis of the insert tool and/or spirally around the longitudinal axis of the insert tool. Advantageously, a particularly efficient and economical coating can be implemented as a result.

Furthermore, it is proposed that, in the region of the coating, an envelope curve of the coating has, at least partly, a greater radius than an envelope curve of the main body. Alternatively or additionally, it is also conceivable that, in the region of the coating, the envelope curve of the coating has, at least partly, a smaller radius than an envelope curve of the main body.

Furthermore, it is proposed that the main body has a groove, which is arranged in the shaft region and/or on the tool head. Advantageously, swarf can be transported away through the groove during drilling or the chisel can be self-sharpening. The coating is in particular arranged inside and/or outside the groove.

In addition, it is proposed that the length of the at least one coating element corresponds to between 15% and 85%, in particular between 30% and 70%, preferably between 40% and 60%, of a length of the groove. The coating elements can be arranged completely or partly inside or outside the grooves.

Furthermore, it is proposed that the tool head has a tip, wherein the coating covers the tip or is arranged at a distance from the tip. Advantageously, as a result the coating is arranged in a region in which high forces act on the insert tool. In this connection, a tip is to be understood in particular as the region of the insert tool which, at the start of the processing of the workpiece, rests on the latter. The tip can be formed as a cutting edge of the cutting element. Alternatively, the tip can also be formed as a substantially point-like tip, such as is used, for example, in pointed chisels.

Furthermore, it is proposed that the coating comprises diamond particles. Advantageously, the coating can be additionally reinforced as a result as a result.

The disclosure also relates to a method for producing an insert tool, in particular a chisel or a drill, having a tool head, having a shaft region in which a main body is arranged, wherein the main body has a first hardness, and having a coating which has a second hardness that is greater than the first hardness. It is proposed that the coating have a hard metal and be applied by a PTA (plasma transfer arc or plasma application welding) process. Advantageously, the coating can be applied in a manner protecting the material of the main body of the insert tool as a result of the PTA process.

Furthermore, it is proposed that the coating has multiple coating elements, which are produced successively via the PTA process. In particular, following the production of the first coating element and before the production of the second coating element, there is a pause. The pause can in particular lie in a range below one minute, preferably in a range below 10 seconds, preferably in the range of a few seconds. Advantageously, the material of the main body is not too rapidly and/or too intensely heated as a result. Furthermore, it is proposed that the coating elements are applied counter to or in the feed direction of the insert tool.

BRIEF DESCRIPTION OF THE DRAWINGS

Further advantages can be gathered from the following drawings description. The drawings, the description and the claims contain numerous features in combination. Those skilled in the art will expediently also consider the features individually and combine them to form practical further combinations. Designations of features of different embodiments of the disclosure which substantially correspond are provided with the same number and with a letter identifying the embodiment.

DETAILED DESCRIPTION

Figure 1A:
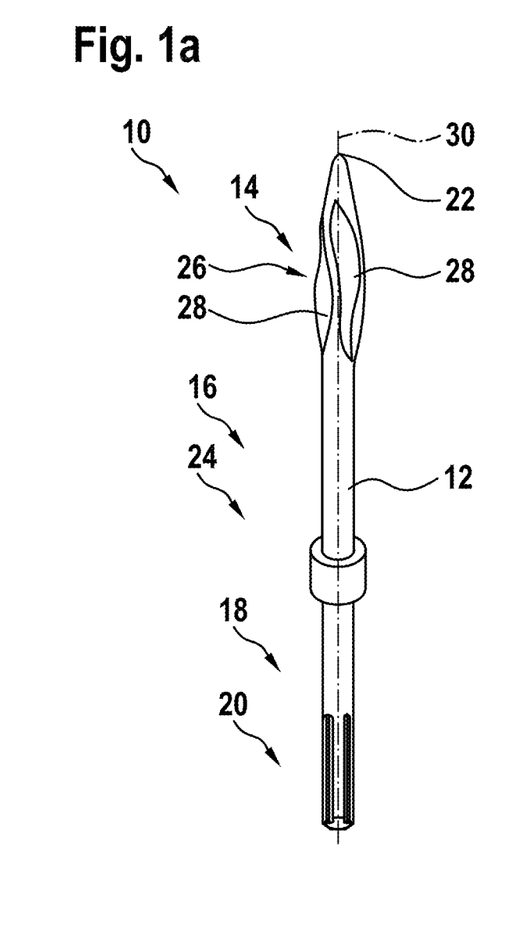
FIG. 1a shows a first embodiment of an insert tool in a side view without a coating.

In FIG. 1a, a first embodiment of an insert tool 10 is shown in an uncoated state. By way of example, the insert tool 10 is formed as a pointed chisel. The insert tool 10a has a main body 12. The main body 12 consists of steel, which is preferably suitable for hardening. The insert tool 10 comprises a tool head 14, which is connected via a shaft region 16 to an insertion end 18.

The main body 12 extends from the insertion end 18 as far as the tool head 14 and, by way of example, is formed in one piece. It would also be conceivable for the main body 12 to consist of multiple pieces, which in particular are connected integrally to one another. By way of example, the insertion end 18 has an SDS-plus interface 20 and is provided to connect the insert tool 10 to a tool holder of a handheld power tool, not illustrated, preferably a hammer drill or a breaker. In the region of the insertion end 18, the insert tool 10 is enclosed when connected to the handheld power tool. The tool head 14 has a tip 22, which is substantially point-like. In the region of the tool head 14, the diameter of the insert tool 10, in particular that of the main body 12, decreases substantially continuously toward the tip 22.

The shaft region 16 of the insert tool 10 has a first subregion 24 and a second subregion 26. The first subregion 24 is arranged on the end of the shaft region 16 that faces away from the tool head 14. In the first subregion 24, the shaft region 16, in particular the main body 12, is substantially cylindrical. The cross section of the insert tool 10, in particular of the main body 12, is substantially constant in the first subregion 24. The second subregion 26 is arranged on the end of the shaft region 16 that faces the tool head 14. In the second subregion 26, the insert tool 10, in particular the main body 12, has grooves 28. The grooves 28 can be produced, for example, via forging or milling of the main body 12. By way of example, the insert tool 10 comprises four grooves 28. The grooves 28 extend along the longitudinal axis 30 of the insert tool 10. The grooves 28 can extend rectilinearly along the longitudinal axis 30, as shown, or spirally along the longitudinal axis 30. Preferably, the grooves 28 wind around the longitudinal axis 30 of the insert tool 10 in a range between 30° and 120°. By way of example, the grooves 28 each wind around the longitudinal axis 30 by about 90°. Alternatively, it would also be conceivable for the grooves 28 each to wind around the longitudinal axis 30 by more than 360°. The grooves 28 each begin at the same height in the second subregion 26 of the shaft region 16 and end at the same height in the region of the tool head 14.

Between two grooves 28 running beside each other there is arranged a land 32. The land 32 has a width 34 (see FIG. 1c) which is smaller than a width 36 of the grooves 28. The lands 32 follow the course of the grooves 28 and thus likewise extends spirally around the longitudinal axis 30.

Figure 1B:
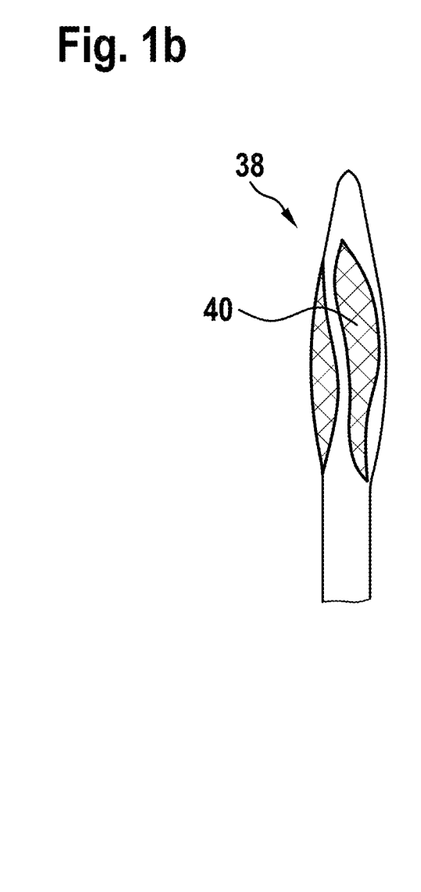
FIG. 1b shows the insert tool according to FIG. 1a with a coating.

In FIG. 1b, the insert tool 10 is shown in a coated state, wherein the insert tool 10 has a coating 38. The coating 38 has four coating elements 40. The coating elements 40 are each arranged in a groove 28. The coating elements 40, starting from the center of the grooves 28, extend toward the tool head 14, in particular to the tip 22 of the tool head 14.

The coating 38 or the coating elements 40 are applied via a plasma powder application process (PTA), in particular to an outer surface of the main body 12. The coating consists of a hard metal, which comprises a hard material and a metal matrix. By way of example, the hard material is formed as tungsten carbide and the metal matrix as NiBiSi, wherein the ratio is 60% by weight of hard material to 40% by weight of metal matrix. Advantageously, as a result it is possible to produce a coating 38 of which the hardness is greater than a hardness of the main body 12 of the insert tool 10. By means of the PTA process, the application of another hard metal as previously described is analogously conceivable. It is important to the disclosure that the hardness of the coating is greater than the hardness of the main body. If not otherwise described, the same coating is used by way of example in the following exemplary embodiments.

The size of the coating elements 40 is chosen in such a way that the coating 38 is produced via multiple individual method steps, in each of which a coating element 40 is applied. Advantageously, as a result the heating of the main body 12 during the PTA is reduced, in order to protect said main body. Following the application of a first coating element 40, the insert tool 10 is first rotated through 180° in order to apply a further coating element 40 to the opposite side. Then, for the third coating element 40, the insert tool is rotated by 90°, and rotated again by 180° for the fourth coating element 40. To implement a uniform coating without excessive heating of the insert tool 10, a period for the production of a coating element 40 is chosen in a range between 0 s and 10 s, preferably in a range between and 3 s. Between the individual application steps or applications of individual coating elements 40, a pause step is carried out, in which the material can cool down. The pause step following the application of the first coating element can be carried out for a shorter time than the following pause steps. The duration of the pause steps lies in particular in a range below 1 min, preferably in a range between 10 s and 30 s.

In the region of the tool head 14, in particular in the region of the tip 22, the coating elements 40 merge into one another. Following the application of the coating 38, the tool head 14, in particular the tip 22, can be ground via a grinding method, in order to increase the removal performance of the insert tool 10.

Figure 1C:
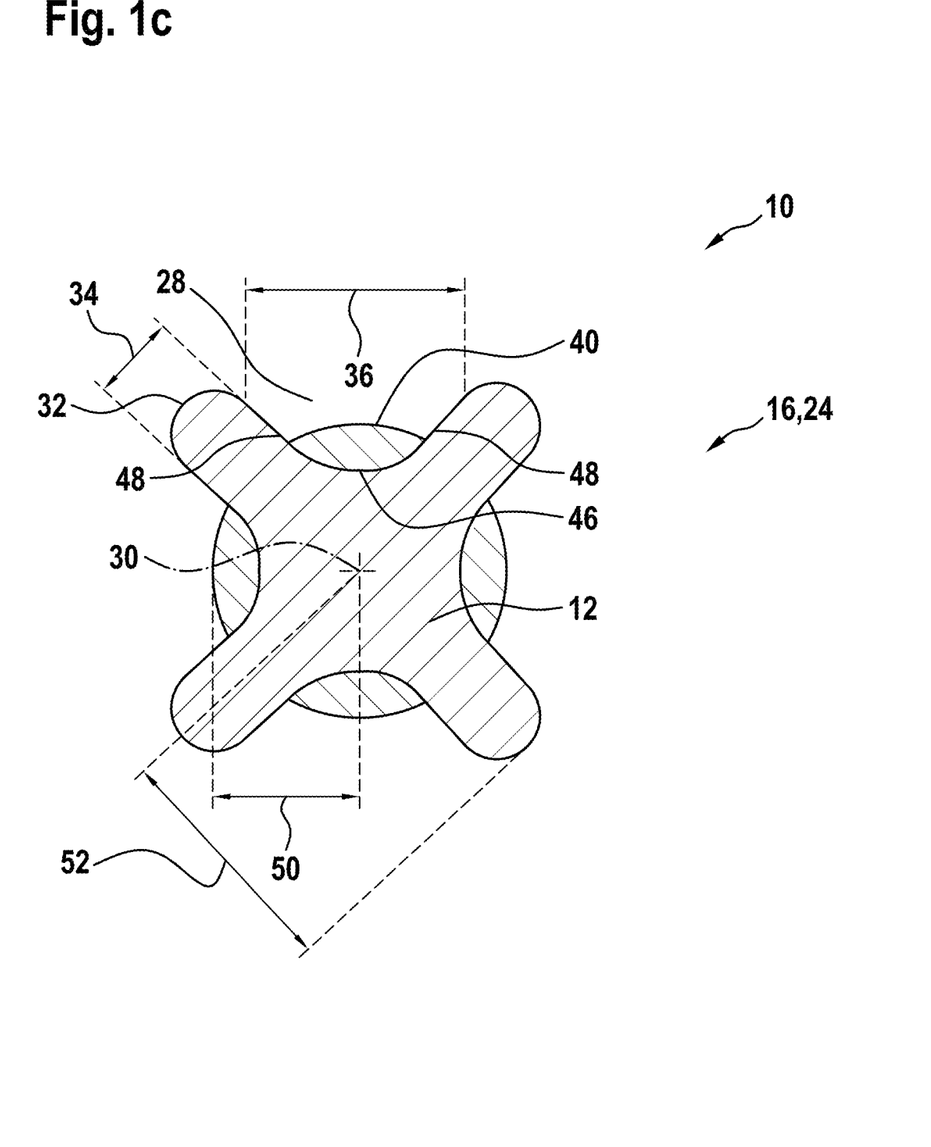
FIG. 1c shows a cross section of the insert tool in the shaft region.

In FIG. 1c, a cross section of the insert tool 10 in the second subregion 24 of the shaft region 16 is shown. The coating elements 40 are each arranged in a groove 28, in particular in a groove base 46 of the grooves 28. Alternatively or additionally, it would likewise be conceivable for the coating elements 40 to be at least partly arranged on one of the flanks 48 of the grooves 28. A maximum spacing 50 of the coating 38 from the longitudinal axis 30 is chosen to be smaller than a maximum spacing 52 of the land 32 from the longitudinal axis 30. As a result, the coating is arranged completely in a space spanned by the lands 32.

Alternatively, it is also conceivable for multiple coating elements 40 to be arranged in each groove 28. By way of example, two coating elements can be arranged beside each other or 3 or more coating elements can also be arranged partly over one another. As a result, the individual coating elements can advantageously be smaller, which means that a shorter time is needed for each application of a coating element and, as a result, lower heating of the main body 12 is developed.

Figure 2A:
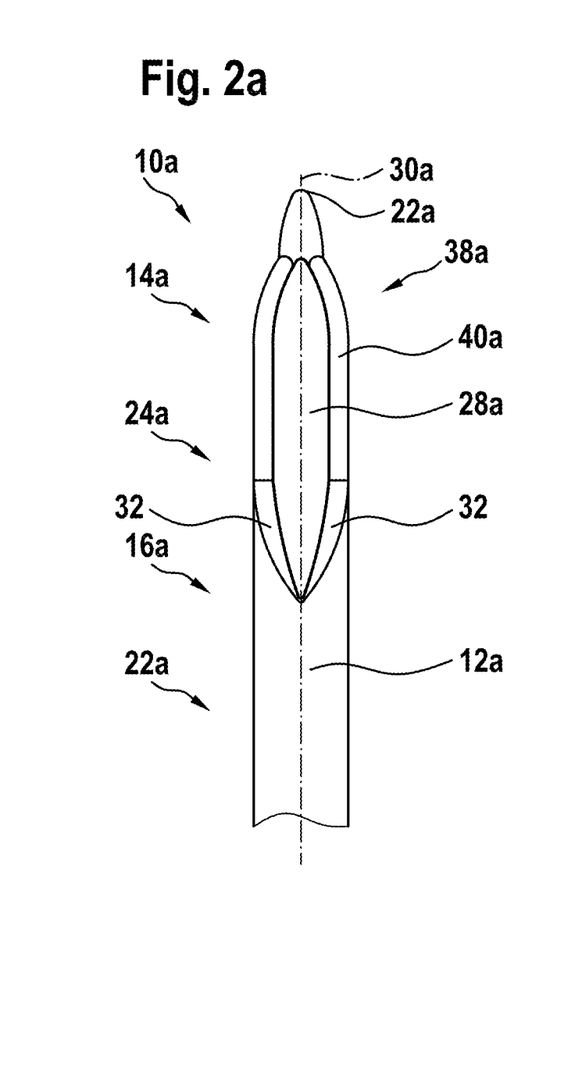
FIG. 2a shows a further embodiment of an insert tool with a coating.
Figure 2B:
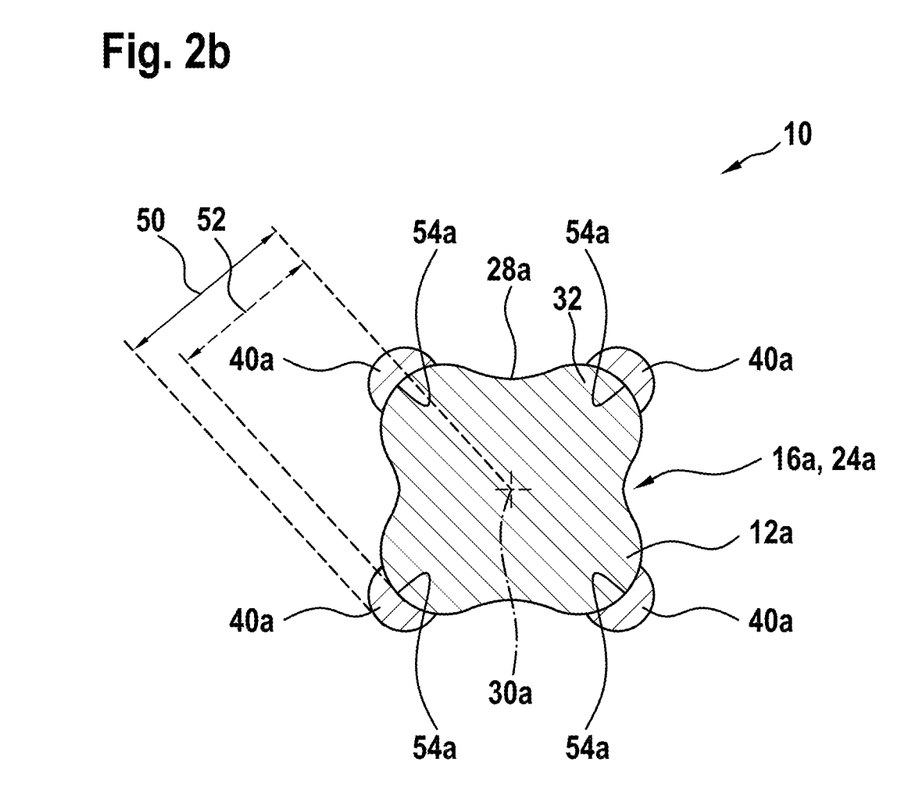
FIG. 2b shows a cross section of the insert tool according to FIG. 2a in the shaft region.

In FIGS. 2a and 2b, an alternative embodiment of the insert tool 10 is shown. As described previously, the insert tool 10a is formed as a pointed chisel and has a main body 12a with a tool head 14a having a tip 22a, a shaft region 16a and an insertion end (not illustrated). The shaft region 16a has a first cylindrical subregion 24a and a second subregion 24a, which comprises four grooves 28a. As opposed to the previous exemplary embodiment, the grooves 28a extend substantially rectilinearly along the longitudinal axis 30a of the insert tool 10a. The coating 38a of the insert tool 10a comprises four coating elements 40a, which are spaced apart completely from one another. The coating elements 40a are each arranged on a land 32a. The coating elements 40a consist of the same hard material as the previously described coating elements 40 and are likewise applied via a PTA process. The start point of the PTA process is approximately in the center of the land 32a, and the end point is in the region of the tool head 14a at a distance from the tip 22a, so that the tip 22a is not covered with the coating 38a.

In FIG. 2b, a cross section through the second subregion 24a of the insert tool 10a is shown. The coating elements 40a are applied completely to the lands 32a, in particular to a land spine 54a of the lands 32a. In addition, it would also be conceivable for further coating elements 40a to be arranged in the grooves 28a and/or for multiple coating elements 40a to be arranged on a land spine 54a. As a result of this arrangement, the maximum spacing of the lands 32a from the longitudinal axis 30a is smaller than the maximum spacing of the coating elements 40a from the longitudinal axis 30a.

Figure 3A:
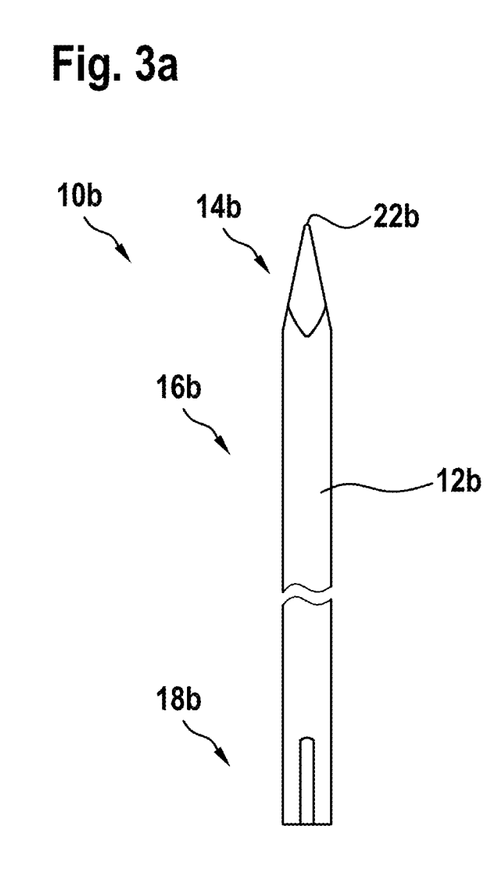
FIG. 3a shows a further embodiment of an insert tool without a coating.
Figure 3B:
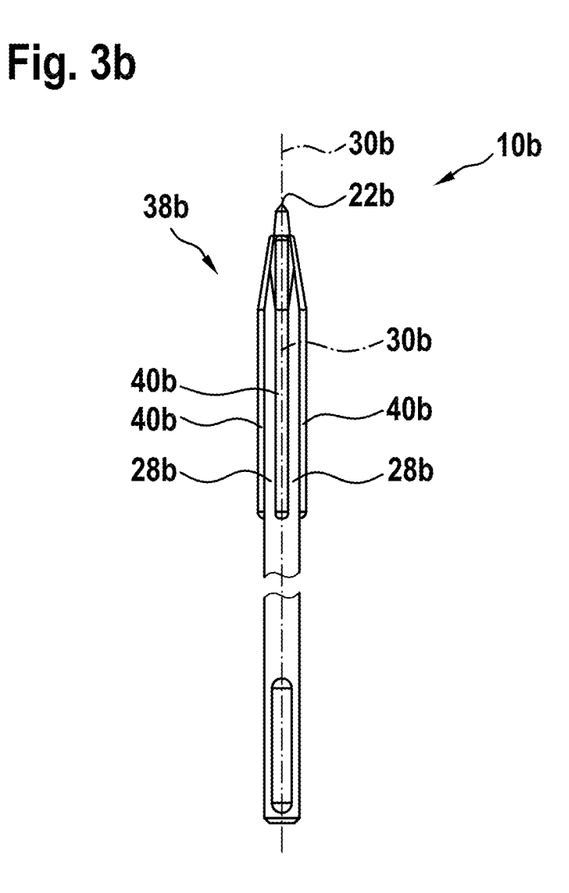
FIG. 3b shows the insert tool according to FIG. 3a with a coating.
Figure 3C:
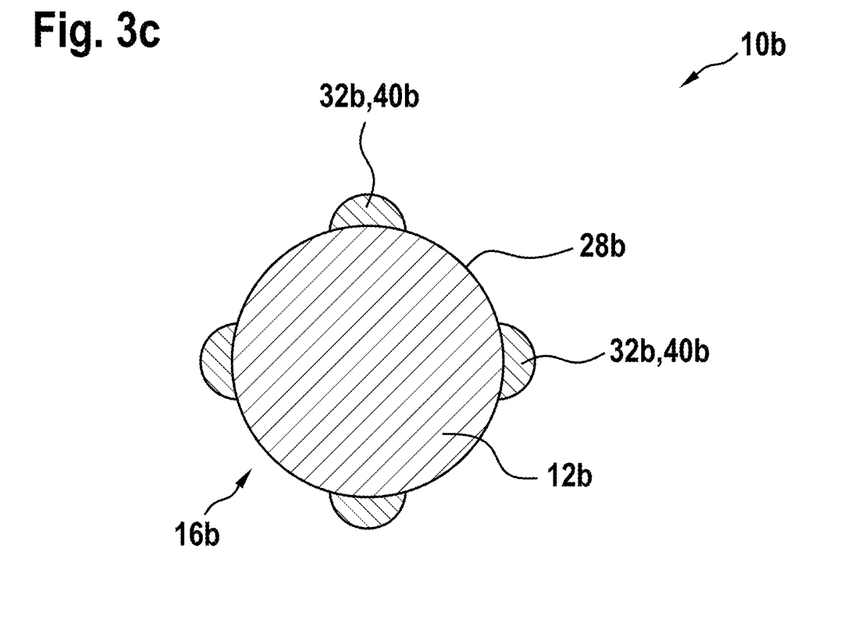
FIG. 3c shows a cross-section of the insert tool according to FIG. 3b in the shaft region.

In FIGS. 3a to 3c, a further alternative embodiment of the insert tool 10 is shown. In FIG. 3a, the insert tool 10b is shown in the uncoated state, and in the coated state in FIG. 3b. The insert tool 10b is, as previously described, formed as a pointed chisel and has a main body 12b with a tool head 14b having a tip 22b, a shaft region 16b and an insertion end 18b. As distinct from the preceding exemplary embodiments, the main body 12b has no different subregions in the shaft region 16b and is continuously cylindrical with a substantially constant external diameter.

The coating 38b has four coating elements 40b which, beginning in a region of the shaft region 16a facing the tool head 14b as far as the tool head 14b, have been applied by means of the previously described PTA process. The coating elements 40b extend rectilinearly and substantially parallel to one another along the longitudinal axis 30b of the insert tool 10b. The coating elements 40b end before the tip 22b, in order that the latter are not excessively heated during the PTA. In the shaft region 16b, the coating elements 40b have a substantially constant spacing from the longitudinal axis 30b. In the region of the tool head 14b, the spacing of the coating elements 40b to the longitudinal axis 30b, decreases continuously, in particular toward one another.

In FIG. 3c, a cross section through the insert tool 10b in the shaft region 16b is shown. The coating elements 40b form lands 32b, between which a groove 28b is arranged. As a result, grooves 28b and lands 32b, which prolong the service life of the insert tool 10b, can advantageously be produced by the coating elements 40b.

Figure 4:
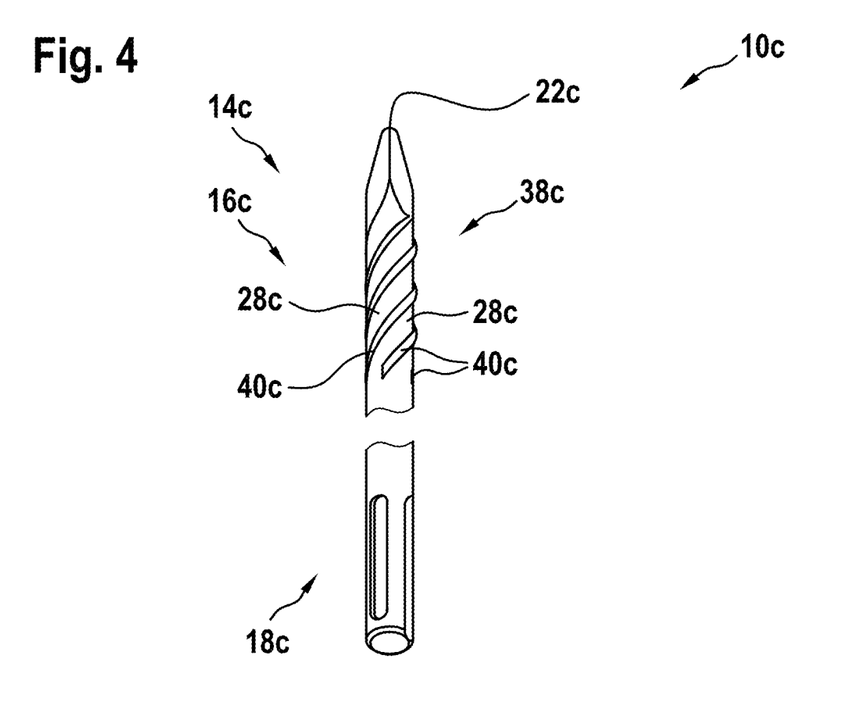
FIG. 4 shows a further embodiment of an insert tool with a coating.

In FIG. 4, an alternative embodiment of the insert tool 10b is shown. As previously described, the insert tool 10c is formed as a pointed chisel and has a main body 12c with a tool head 14c having a tip 22c, a shaft region 16c and an insertion end 18c. The main body 12c itself has no grooves. The coating 38c has four coating elements 40c, which extend spirally around the longitudinal axis 30c of the insert tool 10c. By way of example, the coating elements 40c have a pitch such that they each wind once around the longitudinal axis 30c. The coating 38c and the coating elements 40c have been applied at a distance from one another by means of the PTA process. By way of example, the coating 38c is applied to the end of the shaft region 16c facing the tool head 14c and does not project into the tool head 14c. By means of the coating elements 40c, grooves 28c are formed in the interspaces.

Figure 5A:
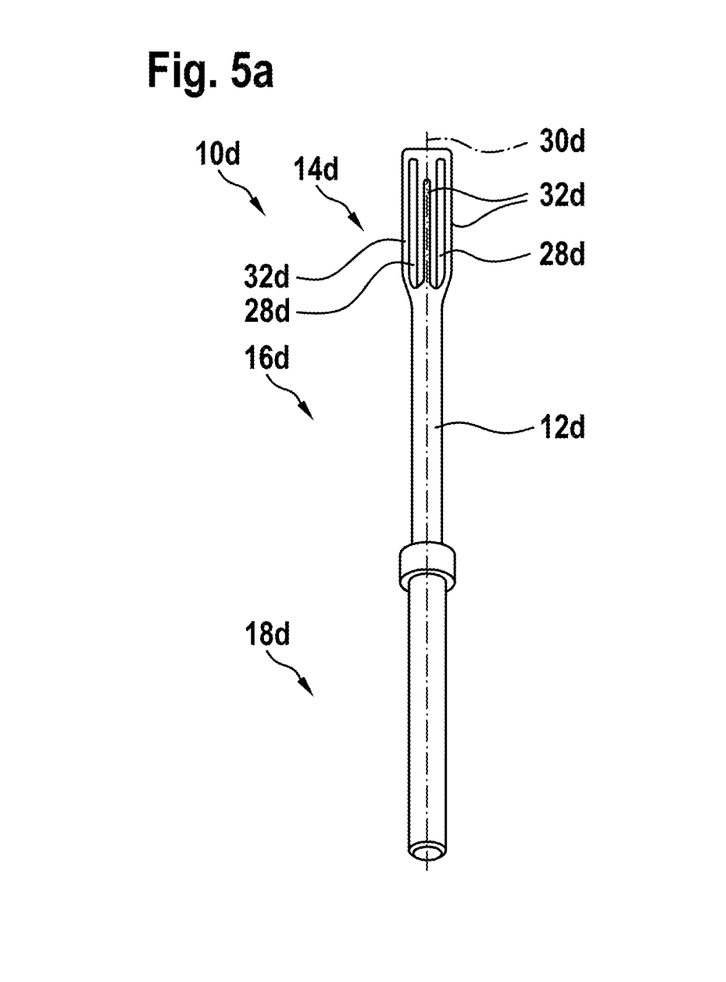
FIG. 5a shows a further embodiment of an insert tool without a coating.
Figure 5B:
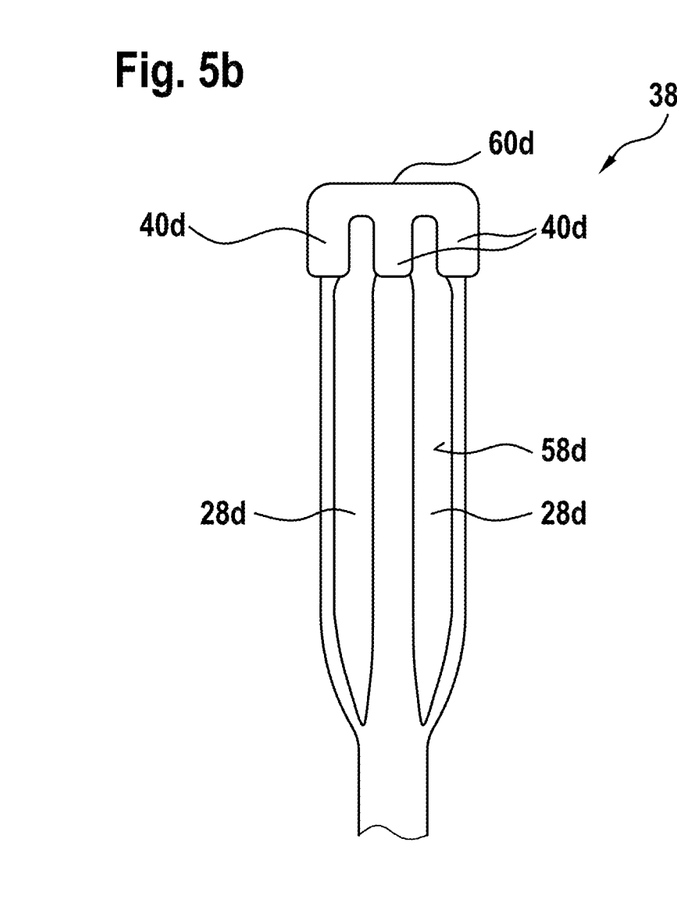
FIG. 5b shows the insert tool according to FIG. 5a with a coating.

In FIG. 5, a further alternative embodiment of the insert tool 10 is shown. The insert tool 10d is formed as a flat chisel and has a main body 12d with a tool head 14d, a shaft region 16d and an insertion end 18d. The shaft region 16d has a cylindrical cross section with a substantially constant external diameter. In the region of the tool head 14d, the external diameter of the main body 12d is enlarged. The tool head 14d has two side surfaces 58d substantially parallel to each other and a tip 22d, which is formed as a cutting edge 60d. The cutting edge 60d extends at right angles to the longitudinal axis 30d of the insert tool 10d. Furthermore, the insert tool 10d, in particular the main body 12d, has four grooves 28d. The grooves 28d are arranged on the tool head 14d and at a distance from the shaft region 16d.

In particular, in each case two grooves 28d are arranged on one of the side surfaces 58d. The grooves 28d extend parallel to the longitudinal axis 30d of the insert tool. Between the grooves 28d and at the edge of the side surfaces 58d, there are formed lands 32d, which extend rectilinearly and parallel to the grooves 28d.

The coating 38d is applied to the main body 12d via a PTA process, as described previously, and, by way of example, has multiple coating elements 40d, which are applied in separate method steps. The coating 38d is arranged at the end of the tool head 14d that faces the tip 22d. In particular, the coating 38d has six coating elements 40d, which are each arranged on a land 32d and project into the tip 22d. Preferably, the coating elements 40d merge into one another in the region of the tip 22d, so that the tip 22d or the cutting edge 60d is covered substantially complete by the coating 38d.

Figure 6A:
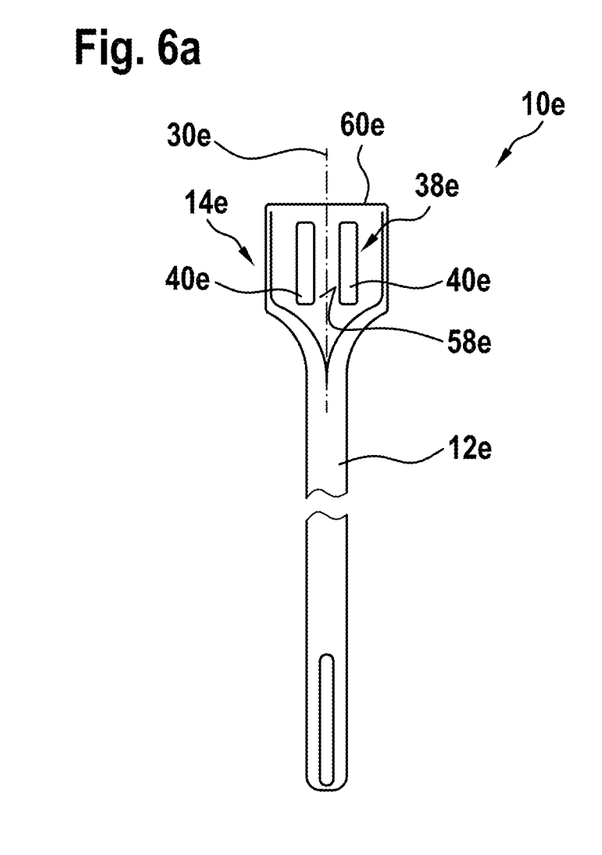
FIG. 6a shows a further embodiment of an insert tool with a coating.
Figure 6B:
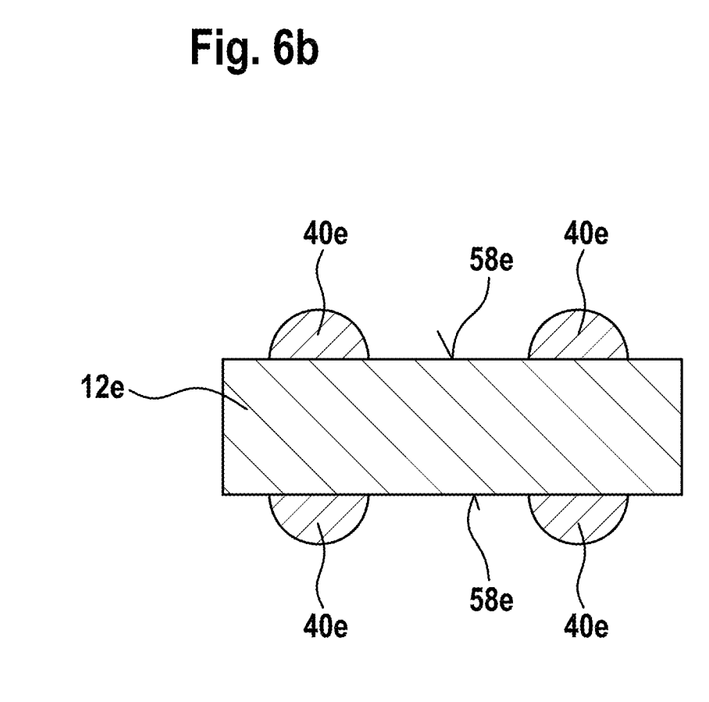
FIG. 6b shows a cross section through the insert tool according to FIG. 6a in the region of the tool head.

In FIG. 6*a*, a further embodiment of the insert tool 10d formed as a flat chisel is shown. As described previously, the tool head 14e has a tip 22e formed as a cutting edge 60e and two side surfaces 58e parallel to each other, which are completely planar. The coating 38e consists of four coating elements 40e, wherein in each case two coating elements 40e are arranged on one of the two side surfaces 58e. The coating elements 40e extend rectilinearly and parallel to the longitudinal axis 30e of the insert tool 10e. In FIG. 6*b*, a cross section through the insert tool 10e in the region of the tool head 14e is shown. The coating elements 40e on the different side surfaces 58e are arranged opposite one another. However, it is also conceivable for the coating elements 40e to be arranged offset from one another on the different side surfaces 58e. Furthermore, it is conceivable that only one coating element 40e or three or more coating elements 40e are provided for each side surface 58e. In addition, it is likewise conceivable that a different number of coating elements 40e is arranged on the side surfaces 58e or that no coating element 40e is arranged on one of the side surfaces 58e.

Figure 7:
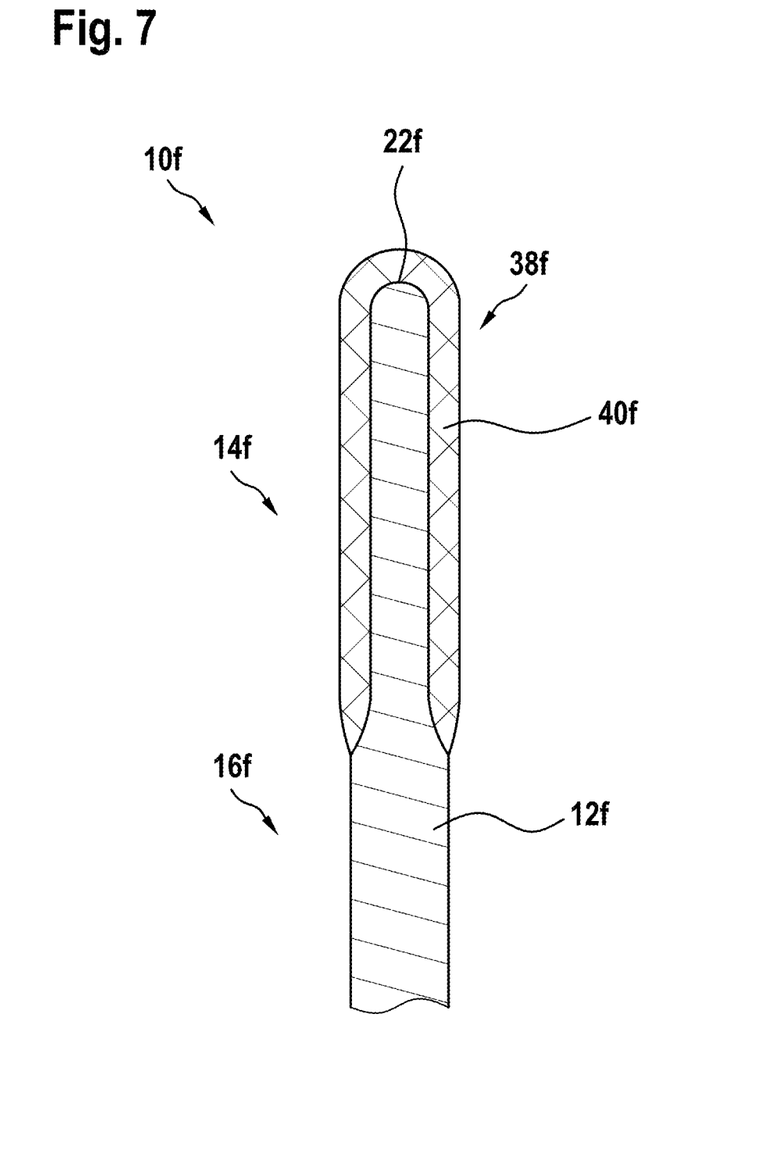
FIG. 7 shows a further embodiment of an insert tool with a coating.

In FIG. 7, a further embodiment of an insert tool 10f with a coating 38f is shown. The insert tool 10f has a main body 12f with a tool head 14f and a shaft region 16f. The insert tool 10f is formed as a chisel. In the shaft region 16f, the main body 12f has a cylindrical cross-section with a substantially constant external diameter. In the region of the tool head 14f, the main body 12f likewise has a cylindrical cross-section with a substantially constant external diameter, wherein the external diameter of the main body 12f in the region of the tool head 14f is smaller than in the shaft region 16f. In the region of the tool head 14f, the main body 12f is rounded off toward the tip 22f.

The coating 38f has a multiplicity of coating elements 40f, which are applied by means of a PTA process in such a way that complete coating of the main body 12f in the region of the tool head 14f is achieved. The thickness of the coating 38f is chosen in such a way that it corresponds substantially to the difference of the external diameter of the shaft region 16f from the tool head 14f. To increase the removal performance of the chisel, the insert tool 10f can be machined by means of a grinding method after the application of the coating 38f.

The invention claimed is:

1. A chisel, comprising:
   a main body having a first hardness, the main body comprising:
   a tool head having a tip; and
   a shaft region; and
   a coating which has a second hardness that is greater than the first hardness,
   wherein the coating has a hard metal which comprises a hard material and a metal matrix,
   wherein the coating extends rectilinearly in a direction parallel or oblique to a longitudinal axis of the chisel, and includes at least a first coating portion that extends rectilinearly parallel to the longitudinal axis, and
   wherein the tool head includes a first side surface and a second opposite side surface, and the first coating portion protrudes from the first side surface and at least a second coating portion that extends rectilinearly parallel to the longitudinal axis protrudes from the second side surface.

2. The chisel according to claim 1, wherein the main body in the shaft region has a cylindrical lateral surface, at least in some sections.

3. The chisel according to claim 1, wherein the main body defines a groove in the shaft region and/or on the tool head.

4. The chisel according to claim 3, wherein the coating is arranged inside the groove.

5. The chisel according to claim 3, wherein a length of a coating element of the coating corresponds to between 15% and 85% of a length of the groove.

6. The chisel according to claim 5, wherein the length of the coating element corresponds to between 40% and 60% of the length of the groove.

7. The chisel according to claim 1, wherein the coating is arranged spaced apart from the tip.

8. The chisel according to claim 1, wherein the coating comprises diamond particles.

9. A chisel, comprising:
   a main body having a first hardness, the main body comprising:
   a tool head having a tip; and
   a shaft region; and
   a coating which has a second hardness that is greater than the first hardness,
   wherein the coating has a hard metal which comprises a hard material and a metal matrix, and wherein the coating forms at least one continuous spiral line protruding outwardly from the main body and extending spirally around a longitudinal axis of the chisel.

10. The chisel according to claim 9, wherein the coating has at least two coating elements, which are arranged partly spaced apart from one another, each of the at least two coating elements forming one continuous spiral line of the at least one continuous spiral line protruding from the main body.

11. The chisel according to claim 10, wherein each of the at least two coating elements are spaced apart uniformly from one another.

12. The chisel according to claim 9, wherein, in the region of the coating, an envelope curve of the coating has, at least partly, a greater radius than an envelope curve of the main body.

13. The chisel according to claim 9, wherein the coating has at least two coating elements which are arranged completely spaced apart from one another.

14. The chisel according to claim 9, wherein each of the at least one continuous spiral lines winds once around the longitudinal axis of the chisel.

15. A method for producing a chisel having (i) a main body having a first hardness and that includes a tool head with a tip and a shaft region, and (ii) a coating which has a second hardness that is greater than the first hardness, the method comprising:
  applying the coating, which includes a hard metal, via a PTA process such that the coating extends rectilinearly in a direction parallel or oblique to a longitudinal axis of the chisel, and includes at least a first coating portion that extends rectilinearly parallel to the longitudinal axis,
wherein the coating has at least one additional coating portion, and the first coating portion and the at least one additional coating portion are produced successively via the PTA process, and
wherein the first coating portion and the at least one additional coating portion are applied in a feed direction of the chisel.

16. A chisel, comprising:
a main body having a first hardness, the main body comprising:
  a tool head having a tip; and
  a shaft region; and
a coating which has a second hardness that is greater than the first hardness,
wherein the coating has a hard metal which comprises a hard material and a metal matrix,
wherein the coating extends rectilinearly in a direction parallel or oblique to a longitudinal axis of the chisel, and includes at least a first coating portion that extends rectilinearly parallel to the longitudinal axis, and
wherein the tool head includes a first side surface from which the first coating portion protrudes, the first side surface having a first outer edge and a second outer edge, the first coating portion being arranged entirely between the first and second outer edges.

17. The chisel according to claim 16, wherein the coating further comprises a second coating portion that protrudes from the first side surface and is arranged entirely between the first and second outer edges.

* * * * *